United States Patent

Diel et al.

[11] 4,012,512
[45] Mar. 15, 1977

[54] ANIMAL FEEDS CONTAINING QUINOXALINE-DI-N-OXIDE DERIVATIVES

[75] Inventors: Peter J. Diel, Basel; Wolfgang Schmid, Therwil, both of Switzerland

[73] Assignee: Ciba-Geigy Corporation, Ardsley, N.Y.

[22] Filed: May 27, 1975

[21] Appl. No.: 580,854

Related U.S. Application Data

[62] Division of Ser. No. 393,863, Sept. 4, 1973, Pat. No. 3,900,473.

[30] Foreign Application Priority Data

Sept. 5, 1972  Switzerland ............... 13032/72

[52] U.S. Cl. .............................................. 424/250
[51] Int. Cl.² ....................... A01N 9/00; A01N 9/22
[58] Field of Search ............... 260/250 Q; 424/250

[56] References Cited

UNITED STATES PATENTS 3,706,742  12/1972  Wilson ....................... 260/250 Q

FOREIGN PATENTS OR APPLICATIONS

| | | | |
|---|---|---|---|
| 1,121,104 | 7/1968 | United Kingdom | 260/250 Q |
| 1,223,720 | 3/1971 | United Kingdom | 260/250 Q |
| 1,330,151 | 9/1973 | United Kingdom | 260/250 Q |
| 1,325,581 | 8/1973 | United Kingdom | 260/250 Q |

Primary Examiner—Albert T. Meyers
Assistant Examiner—D. W. Robinson
Attorney, Agent, or Firm—Frederick H. Rabin

[57] ABSTRACT

Quinoxaline-di-N-oxides corresponding to the formula

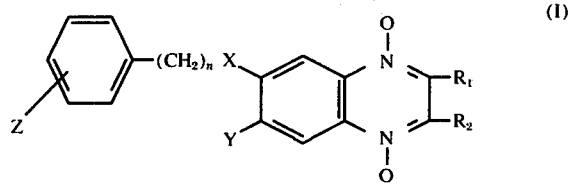

wherein
$R_1$ and $R_2$ represent hydrogen, alkyl, phenyl, alkanoyl, benzoyl, alkoxycarbonyl, carbamoyl, cyano, amino or together a polymethylene group,
Y represents hydrogen or halogen,
X represents oxygen, sulphur, the sulphinyl group or the sulphonyl group,
n represents 0, 1 or 2
Z represents hydrogen, alkyl, halogen-alkyl, halogen or alkoxy
are useful as supplementary feed agents having a growth-promoting action.

11 Claims, No Drawings

ANIMAL FEEDS CONTAINING QUINOXALINE-DI-N-OXIDE DERIVATIVES

This is a division of application Ser. No. 393,863 filed on Sept. 4, 1973, now U.S. Pat. No. 3,900,473.

The present invention relates to new derivatives of quinoxaline-di-N-oxide, to processes for the preparation of these compounds and to their use as supplementary-feed agents having a growth-promoting action.

The new quinoxaline-di-N-oxides correspond to the general formula I

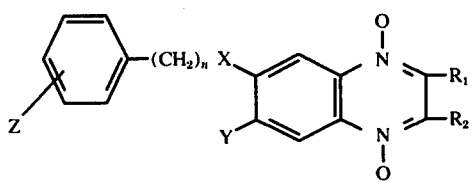

wherein
- $R_1$ and $R_2$ each independently represent hydrogen, lower alkyl, lower alkyl substituted by lower alkoxycarbonyl, phenyl optionally substituted by halogen, lower alkyl or lower alkoxy, lower alkanoyl, benzoyl optionally substituted by halogen, lower alkyl or lower alkoxy, lower alkoxycarbonyl, N,N-di-lower-alkylcarbamoyl, cyano or amino, or
- $R_1$ and $R_2$ together represent a polymethylene group having 3-5 carbon atoms,
- Y represents hydrogen or halogen,
- X represents oxygen, sulphur, the sulphinyl group of the sulphonyl group,
- represents 0, 1 or 2, and
- Z represents hydrogen, lower alykl, halogen-lower alkyl, halogen or lower alkoxy.

By lower alkyl and lower alkanoyl are meant radicals having 1–6 carbon atoms, preferably radicals having 1–4 carbon atoms.

Halogen denotes fluorine, chlorine, bromine or iodine, preferably chlorine.

The preferred compounds of formula I are those in which X represents oxygen or sulphur; and of these, preference is given to the compounds in which X represents sulphur and n is 0.

The following compounds are of particular interest:
6-phenoxy-quinoxaline-1,4-di-N-oxide,
2(3)-acetyl-3(2)-methyl-6-phenoxy-quinoxaline-1,4-di-N-oxide,
6-(p-methoxyphenoxy)-7-chloroquinoxaline-1,4-di-N-oxide,
2(3)-methyl-3-(2)-acetyl-6-(p-methoxy)-phenoxy)-7-chloroquinoxaline-1,4-di-N-oxide,
2,3-cyclohexeno-6-(p-methoxyphenoxy)-7-chloroquinoxaline-1,4-di-N-oxide,
2,3-cyclopenteno-6-phenoxy-7-chloroquinoxaline-1,4-di-N-oxide,
2-(3)-methyl-3(2)-acetyl-6-(p-chlorophenylthio)-quinoxaline-1,4-di-N-oxide,
2-(3)-phenyl-3(2)-benzoyl-6-(p-chlorophenylthio)-7-chloroquinoxaline-1,4-di-N-oxide,
2,3-dimethyl-6-(p-chlorophenoxy)-7-chloroquinoxaline-1,4-di-N-oxide,
2(3)-methyl-3(2)-carbethoxy-6-(p-chlorophenoxy)-7-chloroquinoxaline-1,4-di-N-oxide,
2(3)-cyano-3(2)-amino-6-phenylthio-quinoxaline-1,4-di-N-oxide,
2(3)-methyl-6-(p-chlorophenylthio)-quinoxaline-1,4-di-N-oxide,
2(3)-acetyl-3(2)-methyl-6-(p-methylphenylthio)-quinoxaline-1,4-di-N-oxide,
2(3)-acetyl-3(2)-methyl-6-phenylthio-quinoxaline-1,4-di-N-oxide,
2(3)-ethyl-6-(p-methylphenylthio)-quinoxaline-1,4-di-N-oxide,
2(3)-acetyl-3(2)-methyl-6-benzylthio-quinoxaline-1,4-di-N-oxide,
2(3)-acetyl-3(2)-methyl-6-(p-chlorobenzylthio)-quinoxaline-1,4-di-N-oxide,
2(3)-ethyl-3(2)-carboxylic acid amide-6-(p-chlorophenoxy)-7-chloroquinoxaline-1,4-di-N-oxide,
2-(3)-methyl-3-(2)-acetyl-6-phenylsulphonyl-quinoxaline-1,4-di-N-oxide,
2(3)-methyl-3(2)-acetyl-6-phenylsulphoxyl-quinoxaline-1,4-di-N-oxide,
2(3)-methyl-3(2)-carbethoxy-6-(p-chlorophenylsulphonyl)-quinoxaline-1,4-di-N-oxide,
2(3)-methyl-3(2)-carbethoxy-6-(p-chlorophenylsulphoxyl)-quinoxaline-1,4-di-N-oxide,
2,3-dimethyl-6-benzylsulphonyl-quinoxaline-1,4-di-N-oxide,
2(3)-methyl-3(2)-carbethoxy-6-benzylsulphoxyl-quinoxaline-1,4-di-N-oxide,
2(3)-methyl-3(2)-carbethoxy-6-benzylsulphonyl-quinoxaline-1,4-di-N-oxide,
2,3-dimethyl-6-(p-chlorobenzylsulphoxyl)-quinoxaline-1,4-di-N-oxide,
2,3-dimethyl-6-(p-chlorobenzylsulphonyl)-quinoxaline-1,4-di-N-oxide,
2(3)-methyl-3(2)-acetyl-6-(p-chlorobenzylsulphoxyl)-quinoxaline-1,4-di-N-oxide,
2(3)-methyl-3(2)-acetyl-6-(p-chlorobenzylsulphonyl)-quinoxaline-1,4-di-N-oxide,
2(3)-methyl-3(2)-(N,N-dimethylcarbamoyl)-6-(p-chlorophenoxy)-7-chloroquinoxaline-1,4-di-N-oxide.

The active substances, in the form of solutions, emulsions, suspensions, powders, tablets, boluses and capsules, can be administered to the animals perorally, via the abomasal or by injection direct, the required amount being administered by means of a single dose or by means of repeated doses. The active substances or the mixtures containing them may also be added to the feed or introduced into the drinking trough, or they can be contained in so-called feed premixes.

The quinoxaline-di-N-oxide derivatives of the general formula I can be applied either in the form of a concentrated premix for admixture with a standard feed, or in the form of a prepared feed mixture which can be fed direct to the animals. A growth-promoting action can be achieved in both cases.

A suitable premix is, for example, a mixture of a quinoxaline-di-N-oxide derivative of the general formula I with kaolin, limestone, aluminium oxide, ground shells, bolus alba, aerosil, starch or lactose.

To prepare a feed mixture containing the active component in a concentration of between 1 and 500 ppm, the required amounts of the premix are thoroughly mixed with the appropriate amount of a commercial standard feed for poultry, for pigs or for ruminants.

Further substances favourably affecting the weight and growth of animals can be added to the feed mixture, such as, e.g.:

1. Antibiotics, e.g.
Penicillin (and its derivatives),
Cephalosporin (and its derivatives),
Chloroamphenicol,
Tetracycline,
Rifamycin, Oxytetracycline,
Nigericin,
Parvulin,
Spiramycin,
Flavomycin,
Neomycin,
Thiopeptin,
Tylosin,
Lincomycin,
Bacitracin (and its salts),
Pyrrolnitrine,
Myxin,
Streptomycin.

2. Sulphonamides, e.g.

Sulfisoxazol = N-(3,4-dimethyl-5-isooxazolyl)-sulphanilamide,
Sulfapyrazin = N-2-pyrazinylsulphanilamide,
Sulfadimethoxidiazin = 2,4-dimethoxy-6-sulphanilamido-1,3-diazine,
Sulfamerazine = N-(4-methyl-2-pyrimidyl)-sulphanilamide.

3. Nitrofurans, e.g.

Furoxane = 3-(5-nitrofurfurylideneamino)-2-oxazolidinone,
Carofur = 3-amino-6-[2-(5-nitro-2-furyl)vinyl]-pyridazine,
Altafur = 5-morpholinomethyl-3-(5-nitrofurfurylideneamino)-2-oxazolidinone,
Payzon,
Nitrofurantoin,
Furaclantin,
Furazolidone.

4. Diaminopyrimidines, e.g.

Trimethoprim = 2,4-diamino-5-(3,4,5-trimethoxibenzyl)-pyrimidine,
Dimethoprim = 2,4-diamino-5-(3,4-dimethoxibenzyl)-pyrimidine,
Pyrimethamine = 2,4-diamino-5-(p-chlorophenyl)-6-ethylpyrimidine.

5. Hydroxyquinolines, e.g.

Sterosan = 5,7-dichloro-2-methyl-8-quinolinol,
Vioform = 5-chloro-7-iodo-8-quinolinol,
Hydroxiquinolinecarboxylic acids,
Hydroxinaphthyridinecarboxylic acids,
Nalidixic acid,
Oxolinic acid.

6. Halogenated hydroxidiphenyl ethers, e.g.

Irgasan DP 300 = 2-hydroxi-4,2',4'-trichlorodiphenyl ether,
Nitrohydroxidiphenyl ether,
Halogenated salicyclic acid anilides.

Triarylmethylimidazoles, e.g.

Clotrimazol = diphenyl-o-dichlorophenyl-imidazolyl(1)-methane,
Vitamins,
Maltd = 3.hydroxy-2-methyl-4-pyrone,
2-Mercaptoimidazole,
Ethoxylated alcohols,
2-Bromo-5-nitrothiazole,
Guanidines,
N-subst.-aminooxyacetic acids,
β-Nitropropionic acid,
Phenylcyclopropylamine,
Thiabendazole (2-(4-thiazolyl)-benzimidazole),
Piperazine and its salts,
Benzodiazepine derivatives,
Dihydroxydiphenylsulphides,
4,5-Dihydroxy-2,4,6-octatriendicarboxylic acids,
2-Formyl-4-chlorophenoxyacetic acids,
Straight-chain aliphatic alcohols,
Chloropromazine (2-chloro-lo-(3-dimethylaminopropyl)-phenothiazine,
Aspirin (2-acetylsalycilic acid).

Auxins, e.g.

Auxin a = (3,5-di-sec.butyl-$\alpha,\beta$-trihydroxy-1-cyclopentenevaleric acid),
Auxin b = (3,5-di-sec.butyl-d-hydroxy-$\beta$-oxo-1-cyclopentenevaleric acid).

Additions can also be made of mineral salts and amino acids, as well as of anthelmintics or coccidiostatics.

The compounds of the general formula I are produced according to the invention by the reaction, in the presence of a base, of compounds of the general formula II

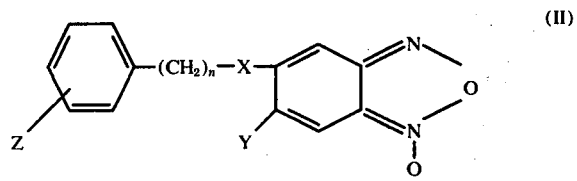

(II)

wherein X, Y, n and Z have the meanings given under formula I, with a carbonyl compound of formula III

(III), or with an enol derivative of formula IIIa, derived from a carbonyl compound of formula III,

(IIIa), whereby in formula IIIa the symbols $R_1$ and $R_2$ have the meanings given under formula I, and A denotes an acyloxy group or an N,N-disubstituted amino group.

The bases used for the reaction of the ketones embraced by formula III are preferably ammonia or primary amines, e.g. cyclohexylamine. The 1,3-dicarbonyl compound and β-keto acid ester, likewise embraced by formula III, are reacted preferably in the presence of tertiary amines such as triethylamine, or in the presence of alcoholates such as sodium alcoholate.

It is advantageous if the reaction be performed in an essentially anhydrous organic solvent. Suitable as such are, in particular, alcohols, such as methanol, ethanol, isopropanol or methylcellosolve. Furthermore, the tertiary amine employed as base may also serve as solvent.

The reaction of compounds of formula III is performed according to the invention at temperatures of between 20° and 70° C, preferably between 50° and 70° C, and the reaction of the enol derivatives of formula IIIa at between 30° and 50° C.

A special process for preparation of 2-amino-3-cyano-quinoxaline-di-N-oxide derivatives of the formula comprises the reaction of a furazan-N-oxide of formula II with malonic acid dinitrile under the above defined conditions. With respect to the end products obtained by these processes, it is not possible though to state precisely whether the amino group will be in the 2-position and the nitrile group in the 3-position or vice versa: the amino group in the 3-position and the nitrile group in the 2-position.

The starting materials of the general formula II are obtained by a process in which compounds of formula IV

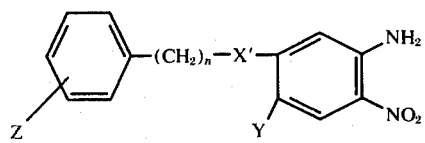
(IV)

wherein X represents oxygen or sulphur, and n, Y and Z have the meanings given under formula I, are allowed to react, in an inert solvent, e.g. ethanol, methylcellosolve, dimethoxyethane, etc., in the presence of potassium hydroxide, with sodium hypochlorite at −10 − +50° C, preferably at 0° − 5° C. Regarding the details concerning the preparation of compounds of formula IV, reference is made to the Swiss Patent No. 462,847, Monatshefte, der Chemie 57, 31–44, (1931), J. Amer. Soc. 1929, 2361–2367, 1931, 529–537, German Patent No. 550,327 and to Gazz. Chim. Ital. 94 (II, 1137–1182) (1964).

A further method for the preparation of compounds of formula I, particularly of those in which $R_1$ and $R_2$ represent hydrogen, phenyl or lower alkyl, consists in the conversion of a quinoxaline derivative of formula V

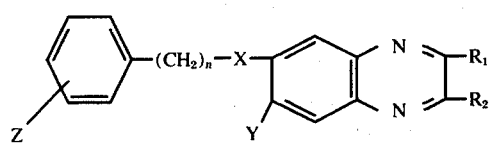
(V)

in which Y, n and Z have the meanings given under formula I, X stands for oxygen or the sulphonyl group, and $R_1$ and $R_2$ represent hydrogen, phenyl or lower alkyl, with the aid of an oxidising agent, into the corresponding di-N-oxide of the general formula I. Suitable oxidising agents are, in particular, organic peroxy acids such as peroxyacetic acid, peroxybenzoic acid or meta-chloro-peroxybenzoic acid, as well as hydrogen peroxide. In the case of conversion into the di-N-oxide, compounds in which X represents sulphur can be simultaneously converted into the corresponding sulphoxides or sulphones. Oxidation is performed in an inert solvent, preferably in a lower haloalkane, e.g. chloroform or carbon tetrachloride.

Starting compounds of formula V are obtained by a process in which compounds of formula VI

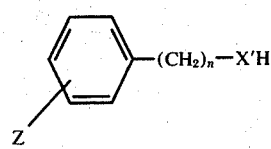
(VI)

wherein n and Z have the meanings given under formula I, and X' represents oxygen or sulphur, are reacted with a halogenated nitroaniline of formula VII

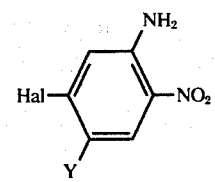
(VII)

wherein Hal represents chlorine or bromine and Y has the meaning given under formula I, at temperatures of between 100° and 200° C in the presence of a strong inorganic base, such as sodium hydroxide or potassium hydroxide, to compounds of formula VIII

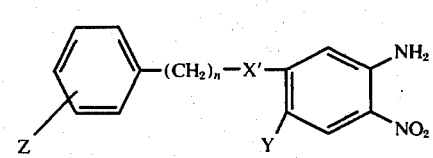
(VIII)

wherein X', n, Y and Z have the above given meanings; and these subsequently reduced to diamino compounds of formula IX

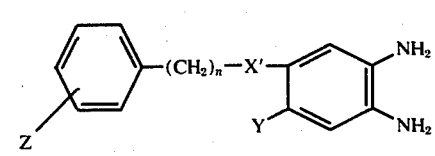
(IX).

Compounds of formula IX wherein X' represents sulphur can be converted by oxidation into the corresponding sulphoxides and sulphones.

The starting materials of formula V are subsequently obtained from the diamine of formula IX by reaction with a 1,2-diketo compound of formula X

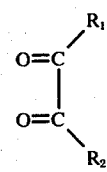
(X)

wherein $R_1$ and $R_2$ have the previously given meanings.

The reaction of the diamine of formula IX with the 1,2-diketo compound of formula X is preferably performed in an inert solvent, e.g. in a lower alkanol or methylcellosolve.

The preparation of compounds of formula I is further illustrated by the following examples.

EXAMPLE 1

Preparation of 6-phenoxy-quinoxaline-1,4-di-N-oxide 45.6 g of 5-phenoxy-benzofurazan-N-oxide and 19.2 g of vinyl acetate dissolved in 300 ml of triethylamine are heated, with stirring, for 2.5 hours in an oil bath at 100° C. The temperature is then lowered to 5° C: the reacton product crystallises out and is subsequently recrystallised from ethanol. The resultant yield is 15 g (= 29.6% of theory) of 6-phenoxy-quinoxaline-1,4-di-N-oxide, M.P. 209°–211° C.

The starting material can be prepared as follows:

A. 2-Nitro-5-benzylthio-aniline 86 g of 2-nitro-5-chloroaniline is dissolved in 400 ml of ethanol and the solution heated to 70° C internal temperature. An addition is made dropwise of a solution of 30.5 g of potassium hydroxide and 68 g of benzylmercaptan in 300 ml of ethanol. The reaction proceeds exothermically. Stirring is maintained overnight at the same internal temperature. The cooled mixture is stirred into ice water; the precipitate is filtered off under suction and recrystallised from ethanol to obtain 104.7 g (= 80% of theory) of 2-nitro-5-benzylthio-aniline, M.P. 113°–115° C.

B. 5-(p-Methylphenylthio)-benzofurazan-N-oxide 60 ml of sodium hypochlorite solution (13%) is added dropwise at ca. 30° C internal temperature, with continuous stirring, to a solution of 3 g of potassium hydroxide in 150 ml of ethanol and 7 g of 2-amino-4-(4'-methylphenylthio)-nitrobenzene. After completion of the addition, stirring is continued for half an hour at room temperature; the precipitated product is filtered off with suction and then washed with 200 ml of water. Recrystallisation from ethanol yields 5.8 g (= 83.5% of theory) of 5-(4'-methylphenylthio)-benzofurazan-N-oxide, M.P. 86°–88° C.

EXAMPLE 2

Preparation of 2(3)acetyl-3(2)-methyl-6-(p-chlorophenylthio)-quinoxaline-1,4-di-N-oxide 13 g of 5-(4'-chlorophenylthio)-benzofurazan-N-oxide is dissolved in 200 ml of triethylamine. An addition is then made dropwise at room temperature of 14.2 g of acetylacetone, and stirring continued overnight. A yellow product crystallises out; this is subsequently filtered off under suction, washed with water, and recrystallised from ethanol to obtain 9 g (= 50% of theory) of 2-acetyl-3-methyl-6-(4-chlorophenylthio)-quinoxaline-1,4-di-N-oxide, M.P. 170° C.

EXAMPLE 3

Preparation of 2(3)-cyano-3(2)-amino-6-phenylthioquinoxaline-1,4-di-N-oxide 9.1 g of 5-phenylthio-benzofurazan-N-oxide and 2.5 g of malonic acid dinitrile is dissolved in 75 ml of dimethylformamide. An addition is made dropwise at room temperature of 0.8 g of triethylamine, and stirring continued overnight. The precipitated, dark red product is suspended in methanol and filtered off under suction to obtain 6.1 g (= 53% of theory) of 2-cyano-3-amino-5-phenylthio-quinoxaline-1,4-di-oxide, M.P. 235° C.

EXAMPLE 4

2,3-cyclohexeno-6-p-methoxyphenoxy-7-chloro-quinoxaline-1,4-di-N-oxide 16 g (0.0547 mole) of 5-(p-methoxyphenoxy)-6-chlorobenzofurazan-N-oxide is dissolved at 90° C in 190 ml of methylcellosolve, and the solution subsequently cooled to 55° C. An addition is made dropwise at this temperature of 9.15 g (0.0847 mole) of 1-morpholine-1-cyclohexene dissolved in 10 ml of methylcellosolve. After completion of the addition, the temperature is slowly raised to 90° C; this temperature is maintained for 5 minutes, and stirring afterwards continued overnight at room temperature; filtration is then carried out at 10° C, the resulting product washed with cold methylcellosolve and recrystallised from 35 ml of dimethylformamide, M.P. 200°–202° C (decomp.); yield 10 g.

EXAMPLE 5

2,3-Dimethyl-6-p-chlorophenoxy-7-chloro-quinoxaline-1,4-di-N-oxide 17.2 g (0.058 mole) of 5-(p-chloro)-phenoxy-6-benzofurazan-N-oxide and 5.1 g (0.07 mole) of methyl ethyl ketone are placed at 60° C into a mixture of 75 ml of methylcellosolve and 50 ml of ethanol. An addition is slowly made dropwise of 7 g (0.07 mole) of cyclohexylamine, and the dark solution stirred for 2 hours at 60°–65° C. The resulting precipitate is filtered of at 10° C under suction, washed, dried, and recrystallised from 120 ml of methylcellosolve; M.P. 203°–205° C; yield 10 g.

EXAMPLE 6

2(3)-methyl-3(2)-carbethoxy-6-(p-chloro)-phenoxy-7-chloroquinoxaline-1,4-di-N-oxide 48 g of 5-(p-chlorophenoxy)-6-chlorobenzofurazan-N-oxide (0.162 mole) and 42 g of acetoacetic acid ethyl ester (0.324 mole) are placed into 150 ml of methylcellosolve. An addition is made dropwise to the light suspension at 30° C of 23.8 g of n-butylamine (0.324 mole); from the dark brown solution there is then a gradual precipitation of a voluminous precipitate. After two hours' stirring at 40° C, the precipitate is filtered off under suction, and washed with a little methylcellosolve; it is then boiled up in 250 ml of methanol, filtered hot and washed with methanol. The resulting 2(3)-methyl-3-(2)-carbethoxy-6-(p-chlorophenoxy)-7-chloro-quinoxaline-1,4-di-N-oxide can be recrystallised from methylcellosolve, M.P. 211°–213° C; yield 28 g.

EXAMPLE 7

2(3)-methyl-3(2)-(N,N-dimethylcarbamoyl)-6-(p-dichlorophenoxy)-7-chloro-quinoxaline-di-N-oxide 22.2 g (0.075 mole) of 5-(p-chlorophenoxy)-6-chlorobenzofurazan-N-oxide is dissolved at 55° C in a mixture of 75 ml of methylcellosolve and 50 ml of ethanol. An addition is made of 11 g (0.085 ml) of acetoacetic acid dimethylamide; an amount of 7.5 g (0.075 mole) of cyclohexylamine is then added dropwise at 55° C, and stirring maintained overnight at room temperature; filtration with suction is performed at 5° C, the resulting product washed with ethanol and dried: M.P. 232°–235° C: yield 11 g.

EXAMPLE 8

Preparation of 6-(p-methoxy)-phenoxy-7-chloro-quinoxaline-1,4-di-N-oxide 20.3 g (0.071 mole) of 6-(p-methoxy-phenoxy-7-chloroquinoxaline and 35.1 g of 80% m-chloroperoxybenzoic acid (0.16 mole) are stirred in 150 ml of chloroform during 2 hours of refluxing; the precipitate is filtered off under suction at room temperature, and the filtrate concentrated to dryness. The two solid residues are combined and then stirred in 150 ml of 10% sodium carbonate solution for 10 minutes at 60° C; they are then filtered off at room temperature, washed neutral with ice water and dried. Recrystallisation from 100 ml of methylcellosolve yields 12.8 g of 6-(p-methoxy)-phenoxy-7-chloroquinoxaline-1,4-di-N-oxide, M.P. 204°–206° C.

The starting material is obtained as follows:

A. 1,2-Diamino-5-(p-methoxy)-phenoxy-4-chlorobenzene 90 g of 2-nitro-4-chloro-5-(p-methoxy)-phenoxyaniline is reduced at room temperature and under normal pressure in 1000 ml of methylcellosolve with 20.9 liters of hydrogen and 20 g of Raney nickel for 32 hours. The catalyst is separated and the filtrate concentrated by evaporation. The intensely viscous oil crystallises slowly and is subsequently recrystallised from 100 ml of ethanol; M.P. 73°–75° C; yield 50 g.

B. 6-(p-Methoxy)-phenoxy-7-chloro-quinoxaline 28.4 g (0.1 mole) of glyoxaldisodium hydrogen sulphite is dissolved in 150 ml of water and 20 ml of methylcellosolve at 60° C. An addition is then made of 26.4 g (0.1 mole) of 1,2-diamino-4-chloro-5-(p-methoxy)-phenoxybenzene dissolved in 30 ml of methylcellosolve. Stirring is maintained for 1 hour at 60° C; a further addition is made of 2.84 g of glyoxaldisodium hydrogen sulphite, and stirring continued for 2 hours at 60° C. The brown suspension is cooled to room temperature and rendered strongly alkaline with KOH. The precipitate is filtered off under suction, washed well with water, dried, and recrystallised from 30 ml of ethanol; M.P. 132°–134° C; yield = 20.4 g.

The following quinoxaline-1,4-di-N-oxide derivatives were obtained by a mode of preparation given in the general text, or analogously to the described examples:

| | |
|---|---|
| 2(3)acetyl-3(2)-methyl-6-phenoxy-quinoxaline-1,4-di-N-oxide | M.P. 153–155° C |
| 2(3)-methyl-3(2)-acetyl-6-(p-methoxy) phenoxy-7-chloro-quinoxaline-1,4-di N-oxide | M.P. 199–201° C |
| 2,3-cyclopropylene-6-phenoxy-7-chloro-quinoxaline-1,4-di-N-oxide | M.P. 190° C |
| 2(3)-phenyl-3(2)-benzoyl-6-(p-chloro)-phenylthio-7-chloro-quinoxaline-1,4-di-N-oxide | M.P. 257–259° C |
| 2(3)-methyl-3(2)-acetyl-6-(p-chloro-phenylthio)-7-chloro-quinoxaline-1,4-di-N-oxide | M.P. 192–195° C |
| 2(3)-methyl-6-(p-chlorophenylthio)-quinoxaline-1,4-di-N-oxide | M.P. 200–202° C |
| 2(3)acetyl-3(2)-methyl-6-(p-methyl phenylthio)-quinoxaline-1,4-di-N-oxide | M.P. 163–165° C |
| 2(3)acetyl-3(2)methyl-6-phenylthio-quinoxaline-1,4-di-N-oxide | M.P. 152–154° C |
| 2(3)-methyl-6-(p-methylphenylthio)-quinoxaline-1,4-di-N-oxide | M.P. 175–177° C |
| 2(3)-acetyl-3(2)methyl-6-benzylthio-quinoxaline-1,4-di-N-oxide | M.P. 181–183° C |
| 2(3)-acetyl-3(2)-methyl-6-(p-chloro-benzylthio-quinoxaline-1,4-di-N-oxide | M.P. 187–189° C |
| 2(3)-methyl-3(2)-(N,N-dimethylcarbamoyl-6-(p-chlorophenoxy)-7-chloro-quinoxaline-1,4-di-N-oxide | M.P. 232–235° C |
| 2(3)-acetyl-3(2)-methyl-6-(4'-methyl-phenylsulphonyl)-quinoxaline-1,4-di-N-oxide | M.P. 180° C |
| 2(3)-methyl-3(2)-carbethoxy-6-(3'-trifluoromethylphenylthio)-quinoxaline-1,4-di-N-oxide | M.P. 131–133° C |
| 2(3)methyl-3(2)-carbethoxy-6-(4'-fluoro-phenylthio)-quinoxaline-1,4-di-N-oxide | M.P. 156–157° C |
| 2(3)-methyl-3(2)-acetyl-6-(2'-phenethylthio)-quinoxaline-1,4-di-N-oxide | M.P. 123–125° C |
| 2(3)-methyl-3(2)-benzoyl-6-(3'-methylphenylthio)-quinoxaline-1,4-di-N-oxide | M.P. 199–201°C |
| 2(3)-carbethoxy-3(2)-ethoxycarbonylmethyl-6-(3'-methylphenylthio)-quinoxaline-1,4-di-N-oxide | M.P. 126–128° C |
| 2(3)-methyl-3(2)-carbethoxy-6-(4'-chlorophenyl-thio-quinoxaline-1,4-di-N-oxide | M.P. 150–152° C |
| 2(3)-methyl-3(2)-carbethoxy-6-(4'-methylphenyl-thio)quinoxaline-1,4-di-N-oxide | M.P. 127–129° C |
| 2(3)-amino-3(2)-cyano-6-(4'-chlorophenylthio)-quinoxaline-1,4-di-N-oxide | M.P. 244–245° C |
| 2(3)-amino-3(2)-cyano-6-(4'-methylphenylthio)-quinoxaline-di-N-oxide | M.P. 239–241° C |
| 2(3)-methyl-3(2)-acetyl-6-(4'-methylphenyl-sulphinyl)-quinoxaline-1,4-di-N-oxide | M.P. 63–65° C |
| 2(3)-methyl-3(2)-acetyl-6-(4'-chlorobenzyl-sulphonyl)-quinoxaline-1,4-di-N-oxide | M.P. 201° C |
| 2(3)-methyl-3(2)-acetyl-6-(4'-chlorobenzyl-sulphinyl)-quinoxaline-1,4-di-N-oxide | M.P. 195–196° C |
| 2(3)-methyl-3(2)-carbethoxy-6-phenylthio- | |

-continued

| | |
|---|---|
| quinoxaline-1,4-di-N-oxide | M.P. 133–135° C |
| 2(3)-amino-3(2)-cyano-6-(3'-trifluoromethyl-phenylthio)-quinoxaline-1,4-di-N-oxide | M.P. 239–240° C |
| 2(3)-methyl-3(2)-carbethoxy-6-(3'-methyl-phenylthio)-quinoxaline-1,4-di-N-oxide | M.P. 126–128° C |
| 2(3)-amino-3(2)-cyano-6-(3'-methylphenylthio)-quinoxaline-1,4-di-N-oxide | M.P. 224–226° C |
| 2(3)-amino-3(2)-cyano-6-(4'-fluorophenylthio)-quinoxaline-1,4-di-N-oxide | M.P. 244–246° C |
| 2(3)-amino-3(2)-cyano-6-(3'-methoxyphenylthio)-quinoxaline-1,4-di-N-oxide | M.P. 224–226° C |
| 2(3)-methyl-3(2)-carbethoxy-6-(3'-methoxy-phenylthio)-quinoxaline-1,4-di-N-oxide | M.P. 117–119° C |

Pasty active-substance concentrates

Such semi-solid or oily active-substance concentrates have, for example, the following composition:
a. 40 parts of 2,3-tetramethylene-6-(p-methoxy)-phenoxy-7-chloro-quinoxaline-1,4-di-N-oxide,
   10 parts of bolus alba,
   2 parts of sodium lignin sulphonate,
   0.2 part of sodium benzoate,
   1.0 part of carboxymethylcellulose,
   46.8 parts of water;
b. 30 parts of 2(3)-cyano-3(2)-amino-6-phenylthi-oquinoxaline-1,4-di-N-oxide,
   70 parts of arachis oil (peanut oil).

The active substances are ground to the finest degree with the carriers, distributing agents and other additives (particle size, e.g. 5 – 10 microns).

The resulting homogeneous concentrates are administered as chemotherapeutical agents, by means of a drink-pistol, to domestic animals and to animals of commercial value.

SUPPLEMENTARY-FEED AGENT

The following feed mixtures were prepared to obtain in each case 6 kg of finished feed containing a) 25 ppm, b) 50 ppm, c) 200 ppm and d) 400 ppm of active substance:
a. 0.15 part of 2(3)methyl-3(2)-acetyl-6-(p-chloro-phenylthio)quinoxaline-1,4-di-N-oxide,
   49.85 parts of bolus alba,
   150.0 parts of standard feed for poultry, pigs or ruminants;
b. 0.30 part of 2(3)-methyl-3(2)-acetyl-6-(p-methox-yphenoxy)-7-chloro-quinoxaline-1,4-di-N-oxide,
   49.70 parts of bolus alba,
   5.0 parts of silicic acid,
   150.0 parts of standard feed for poultry, pigs or ruminants;
c. 1.2 parts of 2(3)acetyl-3(2)-methyl-6-benzylthi-oquinoxaline-1,4-di-N-oxide,
   43.8 parts of bolus alba,
   5.0 parts of silicic acid,
   150.0 parts of standard feed for poultry, pigs or ruminants;
d. 2.4 parts of 2(3)-methyl-6-(p-methylphenylthio)-quinoxaline-1,4-di-N-oxide,
   47.6 parts of bolus alba,
   150.0 parts of standard feed for poultry, pigs or ruminants.

The given active substances are either added direct to the carriers, or absorbed, e.g. dissolved in chloroform, onto the carriers. Grinding is subsequently carried out to obtain the desired particle size of, e.g., 5–10 microns. These feed premixtures are mixed with 5,800 parts of standard feed, or are worked up to give 6,000 parts of finished drinking-liquor. Furthermore, these feed premixes can be tabletted to obtain 6,000 parts of standard-feed pellets.

The above described feed mixtures produce results, in the case of poultry, pigs and ruminants, which indicate a pronounced growth-promoting action, compared with results obtained using corresponding feed mixtures and forms of preparation where there is no content of active substance.

What we claim is:
1. An animal feed composition comprising, a growth promoting amount of, a compound of the formula

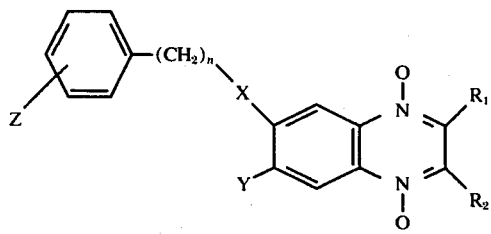

wherein
  each of $R_1$ and $R_2$ is hydrogen, lower alkoxycarbonyl-methyl, lower alkyl, phenyl, benzoyl, lower alkanoyl, lower alkoxycarbonyl, N,N-di-lower-alkylcarbamoyl, cyano or amino,
  or $R_1$ and $R_2$ taken together is polymethylene having from 3 to 5 carbon atoms,
  Y is hydrogen or halogen,
  X is oxygen, sulphur, sulphinyl or sulphonyl,
  Z is hydrogen, lower alkyl, trifluoromethyl, halogen or lower alkoxy, and
  n is 0, 1 or 2 in a standard feed.
2. A composition according to claim 1 in which X is oxygen or sulphur.
3. A composition according to claim 2 in which X is sulphur and n is 0.
4. A method of promoting the growth of animals which comprises administering to said animals a feed composition comprising a growth promoting amount of a compound of the formula

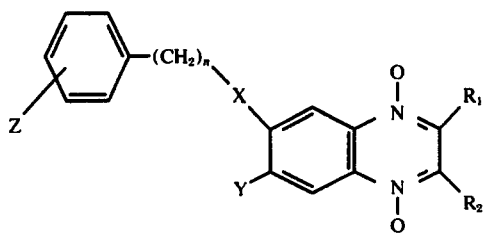

wherein
each of $R_1$ and $R_2$ is hydrogen, lower alkoxycarbonylmethyl, lower alkyl, phenyl, benzoyl, lower alkanoyl, lower alkoxycarbonyl, N,N-di-lower-alkylcarbamoyl, cyano or amino,
or $R_1$ and $R_2$ taken together is polymethylene having from 3 to 5 carbon atoms,
Y is hydrogen or halogen,
X is oxygen, sulphur, sulphinyl or sulphonyl,
Z is hydrogen, lower alkyl, trifluoromethyl, halogen or lower alkoxy, and
n is 0, 1 or 2.

5. A method according to claim 4 in which X is oxygen or sulphur.

6. A method according to claim 5 in which X is sulphur and n is 0.

7. A method according to claim 6 in which the compound is 2(3)-acetyl-3(2)-methyl-6-(p-methylphenylthio)-quinoxaline-1,4-di-N-oxide.

8. A method according to claim 6 in which the compound is 2(3)-acetyl-3(2)-methyl-6-phenylthioquinoxaline-1,4-di-N-oxide.

9. A method according to claim 6 in which the compound is 2(3)-methyl-3(2)-carbethoxy-6-(4'-fluorophenylthio)-quinoxaline-1,4-di-N-oxide.

10. A method according to claim 5 in which the compound is 2(3)-methyl-3(2)-acetyl-6-(4'-methylphenylsulphinyl)-quinoxaline-1,4-di-N-oxide.

11. A method according to claim 6 in which the compound is 2(3)-amino-3(2)-cyano-6-(4'-fluorophenylthio)-quinoxaline-1,4-di-N-oxide.

* * * * *